(12) United States Patent
Jyoti et al.

(10) Patent No.: US 11,663,556 B1
(45) Date of Patent: May 30, 2023

(54) ITEM TRANSMISSION PORTAL

(71) Applicant: Amazon Technologies, Inc., Seattle, WA (US)

(72) Inventors: Manish Jyoti, Edmonds, WA (US); Karan Kumar, Seattle, WA (US); Mahesh Kumar Sharma, Redmond, WA (US); Philip Mark Kaminsky, El Cerrito, CA (US); Timothy Lee Jacobs, Tempe, AZ (US); Steven S. Armato, Seattle, WA (US); Sorabh Kumar, Delhi (IN); Chiranjive Mittal, Snoqualmie, WA (US); Brent M. Cervenka, Dunwoody, GA (US); Hrushikesh Gandhi, Redmond, WA (US); Wesley Herman, Atlanta, GA (US); Ruchit Aswin Shah, Bothell, WA (US); Agrim Jain, Delhi (IN); Chetan Mahendru, Delhi (IN)

(73) Assignee: Amazon Technologies, Inc., Seattle, WA (US)

( * ) Notice: Subject to any disclaimer, the term of this patent is extended or adjusted under 35 U.S.C. 154(b) by 206 days.

(21) Appl. No.: 17/143,520

(22) Filed: Jan. 7, 2021

(51) Int. Cl.
*G06Q 10/10* (2023.01)
*G06Q 10/0835* (2023.01)
(Continued)

(52) U.S. Cl.
CPC ..... *G06Q 10/103* (2013.01); *G06Q 10/06398* (2013.01); *G06Q 10/0838* (2013.01);
(Continued)

(58) Field of Classification Search
CPC ........... G06Q 10/103; G06Q 10/06398; G06Q 10/08355; G06Q 10/0838;
(Continued)

(56) References Cited

U.S. PATENT DOCUMENTS

2016/0110807 A1* 4/2016 Downes ............... G06Q 10/083
  705/37
2016/0140483 A1* 5/2016 Dohm ................... G06Q 10/02
  705/5

(Continued)

OTHER PUBLICATIONS

Dube et al., Simulation Based Analytics for Efficient Planning and Management in Multimodal Freight Transportation Industry, Dec. 1, 2014, Proceedings of the Winter Simulation Conference 2014, pp. 1943-1954 (Year: 2014).*

*Primary Examiner* — Robert D Rines
(74) *Attorney, Agent, or Firm* — Kilpatrick Townsend & Stockton LLP

(57) ABSTRACT

Techniques for generating an item transmission portal are described herein. First information for a plurality of carriers may be maintained which includes a capacity for each carrier. Historical capacity requirements for geographic locations may be maintained. For each geographic location a forecast of future capacity requirements, for each week of a plurality of weeks, may be generated based on the historical capacity requirements. A plurality of documents may be generated for each geographic location based on the forecast and the first information. A value may be determined for each document based on a time and capacity commitment for each document, the historical capacity requirements, and the forecast. A user interface may be generated that includes the plurality of documents and corresponding determined values. The user interface may be updated to reflect acceptance of a specific document by a carrier in response to input received via the user interface.

20 Claims, 11 Drawing Sheets

(51) Int. Cl.
  *G06Q 30/0204* (2023.01)
  *G06Q 10/083* (2023.01)
  *G06Q 10/0639* (2023.01)
  *G06F 3/0484* (2022.01)
  *G06N 20/00* (2019.01)

(52) U.S. Cl.
  CPC ... *G06Q 10/08355* (2013.01); *G06Q 30/0205* (2013.01); *G06F 3/0484* (2013.01); *G06N 20/00* (2019.01)

(58) Field of Classification Search
  CPC .......... G06Q 10/08345; G06Q 10/083; G06Q 10/087; G06Q 10/0835; G06Q 10/08; G06Q 30/02; G06Q 30/0205; G06Q 30/0206; G06N 20/00; G06F 3/0484
  See application file for complete search history.

(56) References Cited

U.S. PATENT DOCUMENTS

| | | | | |
|---|---|---|---|---|
| 2017/0083862 A1* | 3/2017 | Loubriel | ............ | G06Q 10/0835 |
| 2018/0330324 A1* | 11/2018 | McCandless | .......... | G06Q 10/04 |
| 2018/0349849 A1* | 12/2018 | Jones | ............... | G06Q 10/08345 |
| 2019/0266690 A1* | 8/2019 | Mandeno | ............. | G06Q 10/06 |
| 2019/0325534 A1* | 10/2019 | Perry | ................. | G06Q 10/0836 |
| 2021/0097618 A1* | 4/2021 | Laurent | ................. | G06Q 40/00 |

* cited by examiner

ABC Trucking Company

Dashboard 202
Your Trips 206
Capacity 208
Load board 210
Contracts 212
Driver Roster 214
Performance 216
Payments 218
Carrier Account Jane Doe
Give Us Feedback
Sign out ? Frequently Asked Questions You have no active insurance on file. Insurance must be updated. | Update insurance Q Search for a trip ID or load ID or block ID ~ 224 | Advanced search

Trips Needing Attention 226     View in-transit trips →

UPCOMING ~ 228    IN TRANSIT ~ 230    HISTORY ~ 232

4     0     0

[View]    [View]    [View]

Load Board 234 →
AVAILABLE WORK
CHI – Chicago, IL    150
MSN – Madison, WI    75
MSP – Minneapolis, MN    0

Overall Performance 236
AVERAGE TRAILING 6 WEEKS
Overall Score
Not Available
On Time —
Acceptance 83.4%
Success Rate 100%

Contracts 238 →
AVAILABLE SHORT-TERM CONTRACTS
CHI – Chicago, IL    75
MSN – Madison, WI    24
MSP – Minneapolis, MN    35

FIG. 2

Contracts

Available offers  Contracts

ⓘ Congratulations! Contract booking is now available to you.

Book contracts and get paid even if we do not tender any work. Accessorial charges such as toll and fuel are in addition to contract value. All contracts are subject to Program Policies.   316

| Domicile<br>Anywhere | Contract duration<br>All | | Driver type<br>All | # of Drivers<br>All | $ Min block rate  302 | | |
|---|---|---|---|---|---|---|---|

600 results matching

| Domicile | Contract dates | Driver type | Drivers<br>Per week | Blocks ⓘ<br>Per week | Block rate | Min block rate | Contract total ⓘ | |
|---|---|---|---|---|---|---|---|---|
| CHI<br>304 | Sun Oct 6 – Sat Oct 19<br>2 Weeks | Solo 1<br>53" trailer | 5 | 4 Blocks<br>per driver per week<br>1 block = 13h | $1,000 | | $40,000<br>$20,000/week | Accept  314 |
| SEA<br>306 | Sun Oct 6 – Sat Oct 19<br>2 Weeks | Team<br>53" trailer | 1 Team<br>2 drivers | 1 Blocks<br>per driver per week<br>1 block = 119h | $8,000 | | $16,000<br>$8,000/week | Accept |
| MSP<br>308 | Sun Oct 6 – Sat Oct 19<br>2 Weeks | Solo 2<br>53" trailer | 2 | 2 Blocks<br>per driver per week<br>1 block = 37h | $2,000 | | $16,000<br>$8,000/week | Accept |
| SFO<br>310 | Sun Oct 6 – Sat Oct 19<br>2 Weeks | Solo<br>Box truck | 2 | 4 Blocks<br>per driver per week<br>1 block = 13h | $1,000 | | $16,000<br>$8,000/week | Accept |
| SJC<br>312 | Sun Oct 6 – Sat Oct 19<br>2 Weeks | Solo<br>Box truck | 2 | 4 Blocks<br>per driver per week<br>1 block = 13h | $1,000 | | $16,000<br>$8,000/week | Accept |

ⓘ Frequently Asked Question

ABC Trucking Company  204
- Dashboard
- Your Trips
- Capacity
- Load board
- Contracts  212
- Driver Roster
- Performance
- Payments
- Carrier Account Jane Doe  222
Give Us Feedback
Sign out

FIG. 3    300

ABC Trucking Company

- Dashboard
- Your Trips
- Capacity
- Load board
- Contracts — 212
- Driver Roster
- Performance
- Payments
- Carrier Account >

Jane Doe
Give Us Feedback
Sign out

Contracts

Available offers  Contracts

ⓘ Congratulations! Contract booking is now available to you.

Book contracts and get paid even if we do not tender any work. Accessorial charges such Next update XXs as toll and fuel are in addition to contract value. All contracts are subject to Program Policies.

| Domicile Anywhere | Contract duration All | Driver type All | # of Drivers All | $ Min block rate |

600 results matching

| Domicile | Contract dates | Driver type | Drivers Per week | Blocks ⓘ Per week | Block rate | Contract total ⓘ |
|---|---|---|---|---|---|---|
| CHI | Sun Oct 6 – Sat Oct 19 2 Weeks | Solo 1 5'3" trailer | 5 | A block is a fixed duration with a starting location and time and provides a round-trip with one or more stops. | | Base value. Accessorial charges and fuel surcharge are in addition in accordance with Program Policies. |
| SEA | Sun Oct 6 – Sat Oct 19 2 Weeks | Team 5'3" trailer | 1 Team 2 drivers | 1 Blocks per driver per week 1 block = 119h | $8,000 | $16,000 $8,000/week [Accept] |
| MSP | Sun Oct 6 – Sat Oct 19 2 Weeks | Solo 2 5'3" trailer | 2 | 2 Blocks per driver per week 1 block = 37h | $2,000 | $16,000 $8,000/week [Accept] |
| SFO | Sun Oct 6 – Sat Oct 19 2 Weeks | Solo Box truck | 2 | 4 Blocks per driver per week 1 block = 13h | $1,000 | 2 Blocks x $2000 X 2 Drivers X 2 Weeks [Accept] |
| SJC | Sun Oct 6 – Sat Oct 19 2 Weeks | Solo Box truck | 2 | 4 Blocks per driver per week 1 block = 13h | $1,000 | [Accept] |

ⓘ Frequently Asked Question

FIG. 4

Capacity

Submit weekly capacity

Weekly capacity is due by 23:59 PST every Tuesday. Review and reconcile your capacity each week to avoid overbooking capacity.

⊘ Frequently Asked Question

[View History]

| ∨ Week 08: 01/24 – 31 2020 | Solo 1: 8 | Solo 2: 16 | Team: 12 | Box truck: 12 |
|---|---|---|---|---|
| Domicile(s) | Solo 1 | Solo 2 | Team | Box truck |
| CHI - Chicago Contracted | 2 — 502 | 5 | 5 | 5 |
| | [◇] | [3 ◇] | [1 ◇] | [1 ◇] |
| | 504 | | | |
| | *We provide guaranteed work for this value and you get paid a fixed amount even if we do not tender any work.* | 8 | 6 | 6 |
| MAD – Madison, WI Contracted | 2 | 5 | 5 | 5 |
| Dedicated | [2 ◇]—506 | [3 ◇] | [1 ◇] | [1 ◇] |
| | 4 | | | |
| | *We do not guarantee work for this value.* | 8 | 6 | 6 |

[Submit] [Reset]

| > Week 09: 02/01 – 07 2020 | Solo 1: 8 | Solo 2: 16 | Team: 12 | Box truck: 12 |
| > Week 10: 02/08 – 07 2020 | Solo 1: 8 | Solo 2: 16 | Team: 12 | Box truck: 12 |

Sidebar:
- ABC Trucking Company
- Dashboard
- Your Trips
- Capacity — 208
- Load board
- Contracts
- Driver Roster
- Performance
- Payments
- Carrier Account >
- Jane Doe
- Give Us Feedback
- Sign out

FIG. 5

| ABC Trucking Company | Contracts | | | | | | | ⓘ Frequently Asked Question |
|---|---|---|---|---|---|---|---|---|
| Dashboard | Available offers  Contracts | | | | | | | |
| Your Trips | | | | | | | | |
| Capacity | 🔍 Search by ID, domicile ... | | Start date 📅 | End date 📅 | | Driver type<br>All ◇ | | 602 |
| Load board | | | | | | | | |
| Contracts 212 | Upcoming  Active  History 604 | | | | | | | |
| Driver Roster | ID 606 | Domicile | Contract dates ↓≡ | Driver type | Drivers<br>Per week | Blocks ⓘ<br>Per week | Status | Contract total ⓘ |
| Performance | ...4567 | CHI | Sun Oct 6 – Sat Oct 19<br>2 Weeks | Solo<br>53" trailer | 5 | 5 Blocks<br>per driver per week<br>1 block = 13h | Accepted on [date]<br>by [username] | $40,000<br>$20,000/week<br>┌─608<br>2 Blocks x $20000<br>X 2 Drivers<br>X 2 weeks |
| Payments | ...4567 | SEA | Sun Oct 6 – Sat Oct 19<br>2 Weeks | Team<br>53" trailer | 1 Team<br>2 drivers | 1 Block<br>per driver per week<br>1 block = 119h | Accepted on [date]<br>by [username] | |
| Carrier Account > | ...4567 | MSP | Sun Oct 6 – Sat Oct 19<br>2 Weeks | Solo<br>53" trailer | 2 | 2 Blocks<br>per driver per week<br>1 block = 37h | Rejected on [date]<br>by [username] | $40,000<br>$20,000/week |
| | ...4567 | SFO | Sun Oct 6 – Sat Oct 19<br>2 Weeks | Solo<br>Box truck | 2 | 5 Blocks<br>per driver per week<br>1 block = 13h | Accepted on [date]<br>by [username] | $40,000<br>$20,000/week |
| | ...4567 | SJC | Sun Oct 6 – Sat Oct 19<br>2 Weeks | Solo<br>Box truck | 2 | 5 Blocks<br>per driver per week<br>1 block = 13h | Accepted on [date]<br>by [username] | $40,000<br>$20,000/week |
| Jane Doe<br>Give Us Feedback<br>Sign out | | | | | | | | 600 |

FIG. 6

ABC Trucking Company

Dashboard

Your Trips — 206

Capacity
Load board
Contracts
Driver Roster
Performance
Payments
Carrier Account >

Jane Doe — 222
Give Us Feedback
Sign out

204

Trips — 702

Upcoming    IN TRANSIT — 704    History — 706 [1]

Search Tour ID or VRID  Domicile(s) All▾  Filter All▾  Sort by ⇅ Start▾  ⬇ Export  ⇅ Bulk assign equipment  [Accept all] — 710

...8910 ① WGA 22 Richmon...  13h  53" Trailer  $715.00  I. Marant  708
       Tue, July 5 08:30 EST      Provided ...xxxx ① WGA 22 Richmon...  37h  53" Trailer  $705.00  N. Kith
       Tue, July 5 00:00 EST      Provided ...xxxx ① WGA 22 Richmon...  13h  53" Trailer  $705.00  A. Yoga
       Tue, July 5 13:00 EST      Provided Contract C1234-5678-91234567-6901-234567891234567
Block ID 123456789                            20h  53" Trailer  $4,300.00  R. Taylor, R. Bone
Load assignment complete                           Provided
Tuesday, July 5 00:00 – July 11 14:00 EST (120 h) — 712
Trip ID 12345678

ITEM TRANSMISSION PORTAL

BACKGROUND

Warehouses, brick-and-mortar stores, online marketplaces, and other entities may engage with carriers to transport items to customers over a large geographical area. Some merchants may offer a guaranteed shipping date as part of their service to their customers. However, carriers who are tasked with fulfilling such shipping contracts are often left with little to no notice prior to such a sale of items. For example, carriers may be unaware of how much capacity should be reserved for a given week for a given merchant. This can lead to unused capacity or over capacity which results in canceled contracts. Small carriers may be unable to compete with larger carriers when attempting to bid on shipment contracts offered by merchants or other organizations due to economic factors.

BRIEF DESCRIPTION OF THE DRAWINGS

Various embodiments in accordance with the present disclosure will be described with reference to the drawings, in which:

FIG. 2 illustrates an example user interface for a dashboard of an item transmission portal feature, in accordance with at least one embodiment;

FIG. 3 illustrates an example user interface for presenting contracts for an item transmission portal feature, in accordance with at least one embodiment;

FIG. 4 illustrates an example user interface with contextual tips about available contracts for an item transmission portal feature, in accordance with at least one embodiment;

FIG. 5 illustrates an example user interface for adjusting and submitting carrier capacity for an item transmission portal feature, in accordance with at least one embodiment;

FIG. 6 illustrates an example user interface for accepted contracts by a carrier for an item transmission portal feature, in accordance with at least one embodiment;

FIG. 7 illustrates an example user interface for presenting route details for accepted contracts for an item transmission portal feature, in accordance with at least one embodiment;

DETAILED DESCRIPTION

Figure 1:
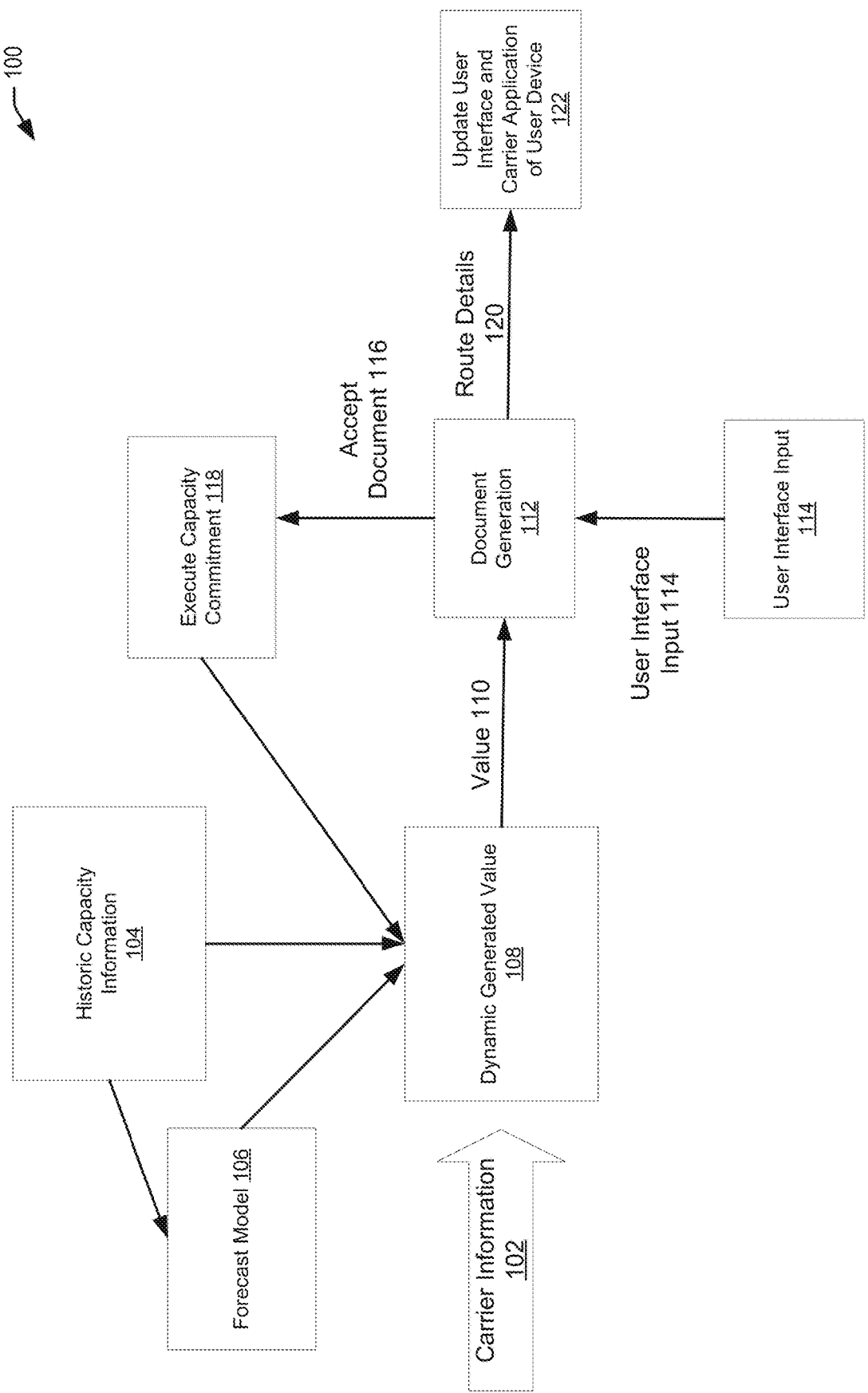
FIG. 1 illustrates a workflow for an item transmission portal feature, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for an item transmission portal feature for dynamically generating a portal which enables item providers to commit capacity and time to complete item transmission tasks. The item transmission portal feature (portal feature) may dynamically generate documents and corresponding values which include details about the time and capacity commitments and a start date for the time and capacity commitments that an item provider may accept via the portal feature. The service provider computers implementing the portal feature may generate, for a geographical location of a plurality of geographical locations, a forecast of future capacity requirements for each week of a plurality of weeks based at least in part on historical capacity requirements for each geographic location. The documents generated by the portal feature provide the ability for item providers to instantly accept future capacity offers by interacting with a user interface associated with the portal feature. Item providers can accept the offers within a short amount of time.

An item provider can include a carrier or any entity responsible for and/or capable of transporting an item from one location to another. Once a carrier accepts a document, their capacity can be guaranteed for use at the future time period (e.g., start date of the document). In embodiments, the service provider computers implementing the portal feature may generate and maintain a user interface that includes the documents and dynamically determined values for the documents. Carriers can interact, via a user device and an application or web browser, with the user interface to browse various documents including their associated information (e.g., time commitment, capacity commitment, start date, etc.,), filter the documents, and accept documents. Upon receiving input, via the user interface, that a carrier or an entity associated with the carrier has accepted a document the user interface may be updated to reflect acceptance of the document. At a later time, such as a certain time prior to the start date for an accepted document, the user interface may be updated to present information about the document that was not previously presented to the carrier. For example, route details for the time and capacity commitment may be presented via the user interface. In accordance with at least one embodiment, the service provider computers may, upon receiving second input via the user interface, provide instructions to launch an application on a user device of an entity associated with the carrier (e.g., a carrier application). Information and instructions may be provided by the service provider computers to the user device and carrier application to present route details, delivery instructions, directions, and other information associated with the document.

In a non-limiting example, the service provider computers implementing the portal feature may dynamically generate a plurality of contracts which detail a time and capacity commitment between a carrier and a shipper for item transmission. For example, a contract may specify a time commitment from Sunday October $6^{th}$ to Saturday October $19^{th}$, with a capacity commitment of 5 drivers and transmission vehicles with at least a 5'3" trailer, for a geographic location corresponding to Chicago, U.S.A. The contracts may be browsed or viewed by carriers via a user interface associated with the portal feature. The contracts may be for various time and capacity commitments for a geographical location and represent a future commitment, by the carrier and on behalf of a shipper, to complete an item transmission task as detailed by the associated contract. Each contract is also associated with a determined monetary value which is dynamically updated to reflect marketplace condition rates. For example, in the given example contract above, a carrier may be presented with a block rate of $1000 and a contract total of $40000. A block may correspond to a certain time period of work during the duration of the contract. For example, a block may correspond to 13 hours of work to be completed by each driver per week. The monetary value for each contract may be dynamically updated based on certain factors or marketplace condition rates such as an acceptance rate by other carriers within the same geographic location, capacity requirements for the geographic location, size or type of contract, or other suitable factors. The contracts dynamically generated by the portal feature may be of different sizes or types. For example, a certain portion of contracts required to satisfy the capacity requirements for a geographic location may be large contracts, e.g., contracts with a greater duration, which require a greater capacity commitment, and correspond to a greater monetary value. Another portion of the contracts required to satisfy the capacity requirements for the same geographic location may be small contracts, e.g., contracts with a smaller duration, which require less capacity commitment, and correspond to a smaller monetary value than large contracts. Small contracts may be more appealing to small carrier organizations as well as large carrier organizations.

Continuing with the above example, a carrier or entity associated with the carrier (e.g., a user, an administrator, a delivery associate) may utilize a web browser or application to view and interact with a user interface that includes one or more contracts for a plurality of geographic locations. An accept feature may be associated with each contract and the entity may interact with the user interface to filter the contracts or accept one or more contracts. After the entity accepts the contract by interacting with the user interface, the user interface may update to reflect acceptance of the contract. Upon expiration of a certain time period and prior to the start date for the contract the same entity may be presented with more details about the accepted contract. For example, while the contract detailed above indicated that the geographic location was Chicago, no pick up locations or delivery locations were specified in the details of the contract. Instead, after expiration of the certain time period, the user interface may be updated to present route details and delivery instructions for the accepted contract. For example, the user interface may be updated to present information about a specific pick up location for items in Chicago and one or more delivery locations throughout the Midwest, such as Indianapolis, Ind., Minneapolis, Minn., Lincoln, NB, etc. Instructions to launch and update an application of a user device associated with the entity may be provided by the service provider computer in response to the entity interacting with the user interface. For example, delivery routes, directions to and from delivery locations, and delivery instructions may be presented via the application of the user device using information and instructions provided by the service provider computer.

In accordance with at least one embodiment, users that interact with the user interface which includes the generated documents can tag certain documents for more efficient recall at a later time. For example, a user can "like" or "favorite" one or more documents presented via the user interface and then filter by liked or favorited documents to update presentation of the documents which are presented via the user interface. The service provider computers implementing the portal feature may generate and maintain information about each carrier participating with the portal features described herein and interacting with the portal feature such as information which indicates each carriers performance rate (e.g., information that identifies successful or unsuccessful completion of the terms of a document, documents accepted, documents rejected after acceptance, etc.,). In embodiments, the service provider computers may limit an amount of documents that a given carrier can accept based on at least their performance rate. Other factors or policies may be used to limit an amount and type of documents that a given carrier may accept by interacting with a user interface. For example, one policy may be enforced by the service provider computers from prohibiting a single carrier from accepting a majority of documents associated within a same geographical location. Another policy may be enforced which limits a legal amount of work that can be completed by drivers during a certain duration. The policies may be specified by an entity associated with the service provider computers and/or the portal feature. In embodiments, a policy may be enforced which ensures that documents automatically are in compliance with Hours of Service guidelines mandated by the Department of Transportation. Policies may be enforced between two consecutive documents for the same carrier in the same geographic location and driver type.

In embodiments, the portal feature may be configured to track and obtain click stream data from users or entities interacting with the user interface of the portal feature. Click stream data may include any suitable information obtained from input/output devices presenting or receiving information via a corresponding user device. For example, click stream data may include mouse clicks, mouse hovers over certain portions of the user interface or with certain documents, input received via the user interface including requests for more information about certain documents, or interactions with an accept feature for a certain document. The click stream data may be used by the service provider computers to presort or filter the documents for a specific carrier prior to the documents being presented to the carrier. As an example, if the click stream data indicates that a specific carrier typically accepts documents associated with a specific geographic location, the user interface may sort the documents to present documents associated with the specific geographic location first via the user interface for that specific carrier.

In accordance with at least one embodiment, the service provider computers implementing the portal feature may utilize one or more algorithms to dynamically determine the values for document as well as generating the documents themselves (e.g., time and capacity commitments, durations, size, geographic locations, etc.,). In embodiments, an algorithm may assign different weights to different strategies implemented and maintained by the algorithm. For example, a first strategy may correspond to minimizing costs to the shippers, while a second strategy may correspond to maximizing engagement by carriers with the portal feature. A third strategy may attempt to strike a balance between the first and second strategies. Each strategy implemented by the algorithm may assign different weights to potential terms of a document such as a time commitment of a certain duration, a capacity requirement, a value, a size of the contract, etc. Techniques described herein provide a number of advantages over conventional carrier and shipper contract formation methods. For example, conventionally carriers may have to spend a large amount of time calling various entities or shipping organizations to secure contracts for shipping items.

This process is usually done with within a short period of time prior to execution of the terms of the contracts. Carriers may have conventionally interacted with load boards to secure spot market rates and attempt to secure longer-term contracts to diversify their portfolio and hedge their risk against market rate fluctuations. However, such load boards do not provide the continuity or certainty required to run a successful carrier operation. Instead, securing long term contracts requires carriers to have direct connections with shippers or to go through a complex process of submitting bids and waiting for unguaranteed results. Conventional methods require manual searching, calling, negotiation, and acceptance of contracts that lack the automatic and technical manner in which documents may be accepted as described with reference to the portal feature herein. Conventional methods do not provide for a marketplace which allows large carriers and small carriers to operate on an equal playing field to view and secure future capacity offers. The portal feature described herein may present documents which carriers can accept weeks in advance, sometimes four to eight weeks in advance. Carriers can interact with the portal feature to view the requirements of each document and capacity offer including an operating region (geographic location), equipment type, number of tractors/vehicles, number of drivers, and the duration of each contract. Each document will be presented via the portal feature with a predetermined value or monetary rate that is dynamically updated based on marketplace factors and other information. High performing carriers can have priority access to some documents prior to other carriers being presented the same contracts to motivate and encourage positive relationships between the carrier and the item portal feature.

FIG. 1 illustrates a workflow for an item transmission portal feature, in accordance with at least one embodiment. In workflow 100 of FIG. 1 one or more service provider computers (not pictured) may implement the portal feature described herein including receiving or obtaining carrier information 102, obtaining historic capacity information 104, implementing a forecast model 106, as well as dynamically generating a value 108. In embodiments, the service provider computers may utilize the value 110 to generate a document 112. In accordance with at least one embodiment, the generated document may be presented via a user interface of a user device (not pictured). User interface input 114 may be received by the service provider computers which indicates interaction or acceptance 116 of a document presented via the user interface. Signals from accepted documents 116 as well as executed capacity commitments 118 by carriers may be provided to the service provider computers for updating the forecast model 106 as well as the dynamically generated value 108 and carrier information 102. In embodiments, the forecast model 106 may utilize the historic capacity information 104 to determine a future forecast for each geographic location.

In accordance with at least one embodiment, the service provider computers may provide instructions and information such as route details 120 to launch and update a user interface for a carrier application 122 of a user device. The route details 120 and instructions to update the user interface for the carrier application 122 of the user device may be provided in response to user input received via the user interface 114 and upon expiration of a certain time period prior to the start date of a given document. For example, the route details 120 may include information that was not previously provided to a carrier who accepted a document 116. The information may include delivery instructions, specific pick up and drop off locations, and directions to and from pick up and drop off locations. In embodiments, carriers may be on boarded with the portal feature by providing carrier information 102 such as contact information (e.g., email, phone, login information), as well as capacity availability that identifies a number of drivers, types of vehicles, and number of vehicles that a given carrier can commit to the portal feature service. The carrier information 102 may also include geographic locations that are serviced by a carrier. A geographic location may include any suitable geographic coordinate system such as a city, county, ZIP code, etc.

In embodiments, the carrier application of the user device may be updated with information and instructions from the service provider computers implementing the portal feature. For example, geographical coordinates for a given carrier or carrier vehicle may be obtained by the service provider computer from the user device associated with the carrier or carrier vehicle. The service provider computers may utilize the geographical coordinates to generate and transmit directions from a current location to a pick up or drop off location in a delivery route associated with the accepted document. The service provider computers may update the forecast model 106, the carrier information 102, such as their performance rate, and the dynamically generated value 108 for a contract upon receiving an indication that a carrier that originally accepted a document—now declines the document. The dynamically generated value 108 for a declined document may be updated to reflect an atypical time frame with which to find a carrier to fulfill the terms of the document. A carrier's performance rate may be updated by the service provider computers as they accept, complete, or decline previously accepted documents.

In accordance with at least one embodiment, the service provider computers may utilize the carrier information 102, such as the performance rate, sometimes referred to as the historical performance of the carrier, to determine the certain time period prior to the start date of a document to present additional information about the document to the carrier. For example, for carriers who have a performance rate which indicates a high percentage of completed documents accepted, the certain time period may be updated from a standard two days prior to the start date of a document to four days prior to the start date of the document. The carrier information 102 may also be used to filter or sort documents prior to generating a user interface and presenting the documents to carriers. For example, if the carrier information 102 for a given carrier indicates that the carrier typically services geographic locations associated with Chicago, the service provider computers may sort presentation of the available documents to present documents associated with Chicago first to that particular carrier.

FIG. 2 illustrates an example user interface for a dashboard of an item transmission portal feature, in accordance with at least one embodiment. The user interface 200 depicted in FIG. 2 may be an example of a user interface presented to a user via a user device and corresponds to user interface features associated with the portal feature described herein. For example, the user interface 200 presented in FIG. 2 includes a personalized dashboard 202 or home page for a specific carrier 204 (e.g., "ABC Trucking Company"). As illustrated in FIG. 2, the user interface 200 that corresponds to a user interface of the portal feature described herein may include one or more features, tabs, or areas 206-220 which can be interacted with by a carrier, via a user device, to be presented with other information. User interface 200 features or areas 206, 208, and 212 are discussed in further detail below with reference to FIGS. 3-7. An entity 222 associated with the carrier 204 such as an employee, administrator, or agent of the carrier 204 may provide login information to be presented with user interface 200 and interact with user interface 200. The service provider computers implementing the portal feature may maintain associations between entities of a carrier, login information, and enforce security protocols for logging into the portal feature.

As illustrated in FIG. 2, the dashboard 202 of user interface 200 may present information for a carrier 204 and entity 222 regarding a number of features. For example, the entity 222 may provide a trip identifier, load identifier, or block identifier to search for trips included in accepted documents at 224. A specific area 226 of user interface 200 provides information and interactive features for viewing upcoming 228 trips corresponding to accepted documents, in transit 230 trips which correspond to accepted documents which are currently being performed by the carrier 204, as well as a history 232 feature which enables the carrier 204 to view information about historical documents accepted, declined, and completed by the carrier 204. The entity 222 may interact or provide input via user interface 200 to update the user interface 200 to present new or different information than what is presented in user interface 200. User interface 200 may include area 234 which may transition or update the user interface 200 to a load board which includes available documents (contracts) which can be accepted by the carrier 204. For example, the area 234 depicts a preview which displays information indicating that for the geographic location Chicago there are 150 available documents ready for viewing and accepting.

User interface 200 may include area 236 which presents information regarding the overall performance of carrier 204 including a score, an on time ration, an acceptance percentage, and success rate percentage which corresponds to the successfully completed contracts by the carrier 204 which were accepted. The user interface 200 includes area 238 which may transition the user interface to the contracts 212 area. Area 238 may present information or a preview of available short term contracts (referred to as small contracts or small documents). For example, area 238 presents information which indicates that Madison has 24 short-term contracts available for viewing and acceptance by the carrier 204. In embodiments, the entity 222 may interact with user interface 200 to be presented with information associated with each area or tabs 202-220. For example, the entity 222 may interact, via the user interface 200, with the driver roster 214 feature to be presented with information associated with current drivers associated with carrier 204. The carrier 204 may utilize area 214 to update information about drivers such as the number of drivers, the type of drivers, availability of drivers, and contact information for the drivers associated with carrier 204.

The performance 216 feature may present information similar to the area 236 of user interface 200 which provides a detailed breakdown of the performance of carrier 204 regarding accepted documents, documents declined after being accepted, successfully completed tasks related to accepted documents, or unsuccessful completed tasks related to accepted documents. The payments 218 feature may present information about payments received by the carrier 204 via contracts accepted via the item portal feature associated with user interface 200 as well as upcoming amounts accepted by the carrier 204 for accepted documents which have not yet been performed. The carrier account 220 feature may enable carriers 204 to update contact information, carrier preferences, carrier information such as login information (e.g., username and password), communication preferences, bank account information, or other suitable information which may be required to contact the carrier 204 or enable the carrier 204 to interact with the portal feature.

FIG. 3 illustrates an example user interface for presenting contracts for an item transmission portal feature, in accordance with at least one embodiment. FIG. 3 includes user interface 300 which may be an updated or transitioned version of user interface 200 of FIG. 2. For example, the entity 222 may have interacted with user interface 200 and feature 212 to be presented with user interface 300. The user interface 300 depicted in FIG. 3 may include filter features 302 which can be utilized to filter the documents 304-312 presented via user interface 300. For example, entities 222 on behalf of carries such as carrier 204 may filter, using the filter features 302, the documents 304-312 presented via user interface 300 based on a domicile (geographic location), for certain contract durations, by driver types, number of drivers, or minimum monetary values per block. Each document 304-312 includes information about the document including the domicile, contract dates (e.g., start date and end date), driver type, number of drivers per week, blocks per week, a block rate, and a contract total. As described herein, the documents 304-312 presented via the user interface 300 may be for a future time and capacity commitment such that when the carrier 204 and entity 222 interact with the accept feature 314, they have committed to a contract for the time and capacity commitment displayed for each document.

The portal feature illustrated in FIG. 3 enables carriers to accept contracts for a future time period, sometimes weeks in advance, for the displayed monetary amount in order to provide more continuity and certainty to future capacity requirements for both the carrier and the shipper. This enables carriers to more efficiently schedule their workloads given their available capacity and shippers to negotiate better prices as they are committing to the work in advance as opposed to conventional day of contracts. In embodiments, certain carriers may be presented with some documents prior to other carriers being presented with the same documents based on the carrier's performance rate or as a result of the carrier being a member of a VIP program. The documents 304-312 that are presented via user interface 300 may be filtered or sorted prior to generating user interface 300 based on preferences or click stream data associated with the carrier 204. For example, if the carrier 204 normally accepts, via entity 222 interacting with user interface 300, documents with 3 or more drivers, the documents presented may be sorted to present documents with 3 or more drivers first in the search results presented via user interface 300.

The user interface 300 may present information and links which can provide further information about one or more program policies 316 enforced by the service provider computers implementing the portal features described herein. For example, the service provider computers may be configured to enforce a policy which restricts carriers from accepting over a certain number of documents per geographic location or in aggregate, a policy which limits the amount of work a driver for a given carrier may work per document accepted according to legal work condition requirements, a policy which limits carriers from accepting documents based on their performance rate such that bad actors are prevented from accepting all available work without the capacity or intention of being able to complete the accepted work, or other suitable policies. Should a carrier attempt to accept a document which violates one of the enforced policies they may be prevented from doing so and provided a message which indicates why they are unable to accept a certain document.

In accordance with at least one embodiment, the portal feature may include an option or feature for enabling carriers to specify attributes for a document for a geographic location(s). For example, a carrier may be able to provide attributes for a document that they wish to commit to with the portal feature. The carrier may specify such attributes such as a type of document (e.g. document duration, a large document or small document), a specific time period (e.g., specific weeks), a driver type, driver counts, etc. A carrier may interact with the user interface 300 to provide such attributes and the portal feature may determine whether a document with such attributes is available given the constraints provided by the carrier. Should such a document be able to be generated, the carrier will be informed of the generation and acceptance of the document by the service provider computers implementing the portal feature and user interface 300. In embodiments, the portal feature may also be configured to generate and present a cancelable document. A cancelable document may specify a certain monetary amount that is guaranteed to the carrier even if the document is later canceled by the shipper or service provider computers implementing the portal feature. A cancelable document may be canceled by the shipper and/or service provider computers with enough lead time to enable the carrier to find another document via the portal feature or a load board to utilize the remaining capacity of the carrier that would have been dedicated to the canceled document.

FIG. 4 illustrates an example user interface with contextual tips about available contracts for an item transmission portal feature, in accordance with at least one embodiment. FIG. 4 depicts an update to user interface 300 of FIG. 3 which includes contextual tips for information about the documents presented via user interface 300. For example, a user may scroll over a certain term of portion of a document, such as document 400, to be presented with contextual tips 402-408. As illustrated in FIG. 4, contextual tip 402 may provide more information about a geographic location, contextual tip 404 may provide more information about what a block consists of, contextual tip 406 may provide more information about the contract total for a document such as document 400, while contextual tip 408 provides more information about the block per driver per duration break down for a document. Although contextual tips 402-408 are presented via FIG. 4 more or less contextual tips may be provided based on user input provided by entity 222 interacting with user interface 300.

In accordance with at least one embodiment, the portal feature may generate a certain number and certain type of documents per geographical location. For example, the Chicago, Ill. geographic location may require more capacity and time commitments than Las Cruces, N. Mex. The service provider computers implementing the portal feature may utilize information such as historical capacity requirements as well as other information to determine the number and type of documents to generate and provide for acceptance by carrier per week for each geographic location. In embodiments, the service provider computer may be configured to stagger the release and presentation of the generated documents per geographical location. For example, if 50 documents are generated for a given geographical location such as Seattle, Wash., the system may present a portion of the 50 documents to active users of the portal feature at a first time period and then present another portion of the 50 documents that were not previously presented at a second time period. This enables carriers to take their time when reviewing and accepting documents while also enabling users to not feel rushed when reviewing documents for a specific geographical location. Carriers, such as carrier 204, via entities such as entity 222, may provide information which can be used to set reminders or notifications when the system updates the portal feature to include documents which correspond to the requirements of the notification. For example, a carrier can set up a notification which informs them, via a message, when documents are provided for a certain geographic location, of a certain size, of a certain type, or of a certain duration.

FIG. 5 illustrates an example user interface for adjusting and submitting carrier capacity for an item transmission portal feature, in accordance with at least one embodiment. FIG. 5 illustrates user interface 500 which may be an updated or transitioned user interface 200 in response to input received from entity 222 interacting with the capacity feature 208 of user interface 200 of FIG. 2. As depicted in FIG. 5, the capacity feature 208 may be configured to enable carrier 204 and entity 222 to submit weekly capacity 502 of drivers, types of drivers, and available transmission vehicles for submittal to the service provider computers implementing the portal feature. The user interface 500 may provide tips or messages 504 and 506 as carriers adjust capacity for a given domicile based on the contracts accepted for said domicile. For example, a carrier 204 and entity 222 may interact with user interface 500 to reduce the number of drivers of each type or reduce the amount of transmission vehicles available for a given week and geographic location.

In accordance with at least one embodiment, the service provider computers implementing the user interface 500 may be configured to receive the adjustments to the capacity provided via user interface 500 against the capacity requirements for accepted documents by a carrier. If the capacity adjustments do not violate the commitment accepted by the carrier 204, then a message such as message 504 may be provided that indicates that the adjustment is still valid for the documents for the particular geographic location. However, as indicated in message 506, if the capacity adjustments made by the carrier 204 would result in a violation of the capacity commitment accepted by the carrier for the geographical location, the carrier 204 may be informed of such violation. The user interface 500 may also be configured to present historical capacity submittals by the carrier as well as the ability to submit carrier capacity for future time periods or weeks ahead in a given year or years.

FIG. 6 illustrates an example user interface for accepted contracts by a carrier for an item transmission portal feature, in accordance with at least one embodiment. FIG. 6 depicts user interface 600 which may be an updated or transitioned user interface 200 of FIG. 2 in response to entity 222 interacting with contracts feature 212 of FIG. 2 on behalf of carrier 204. The user interface 600 illustrates an example user interface for presenting information about accepted documents by a carrier such as carrier 204. The user interface 600 may be configured to enable a carrier such as carrier 204 to search through their historically accepted documents via a search feature 602. Carriers may interact with user interface 600, via entities such as entity 222 associated user devices, to search by an identifier associated with a document, by domiciles or geographic locations, by a start date, an end date, or by a driver type. As illustrated in FIG. 6, each document may be associated with a unique identifier that is generated by the service provider computers implementing the portal features described herein.

The historically accepted documents presented in user interface 600 may include information about each document, including its identifier (e.g., 606), domicile, contract dates, driver type, drivers per week, blocks per week, status, and contract total. The user interface 600 may present contextual information for certain information such as a breakdown of a contract total for a particular document presented at 608 in response to interacting (user input) with the user interface 600. As illustrated in FIG. 6, the historical information about documents may include information not only about accepted documents but rejected documents along with identifiers for users and dates of when documents were accepted or rejected. Other information may be provided such as for a document that was initially accepted but then subsequently rejected prior to the start date of the particular document.

FIG. 7 illustrates an example user interface for presenting route details for accepted contracts for an item transmission portal feature, in accordance with at least one embodiment. FIG. 7 depicts user interface 700 that may be an update or transition of FIG. 2 in response to entity 222 interacting with the your trips feature 206 of user interface 200 of FIG. 2. The user interface 700 may be configured to present information about upcoming documents 702 (e.g., documents with a start date that is imminent), in transit documents 704 (e.g., documents which correspond to currently in transit trips by the carrier 204), and historical documents 706 which correspond to historical trips for historically accepted documents.

In accordance with at least one embodiment, the user interface 700 may be configured to present route details 708 for each accepted document. For example, the route details 708 may include a start date, an end date, a starting location or pick-up location, one or more drop off or delivery locations, and an end location, along with hours worked per each pick up and drop off location, a type of vehicle, a block rate per trip, and an assigned driver name or identifier associated with each trip. An indicator of the trips progress 710 may also be depicted via user interface 700. A user, or entity 222 may interact with user interface 700 via an associated user device to be presented with contextual information 712 about an accepted document. For example, each document (contract) may be assigned a unique identifier, a unique block identifier, an indication of the status of a load (e.g., load assignment complete), a start date and end date for a trip associated with an accepted document, and a trip identifier. The information provided via user interface 700 can be used by the service provider computers to update the forecast generation model, the dynamically determined value for future documents with similar characteristics or the same geographical location, as well as the subsequent document generation for the same geographical location.

In accordance with at least one embodiment, users such as entity 222 may interact with the user interface 700 to search the upcoming 702, in transit 704, or historical 706 documents which correspond to an associated carrier, such as carrier 204. The entity 222 may search the accepted documents by the contract identifier, the block identifier, or the trip identifier. In accordance with at least one embodiment, the entity 222 may interact (provide user input), via user interface 700 and an associated user device, to the service provider computers for generating and transmitting instructions to the user device for launching an application (a carrier application). The instructions that are generated and provided by the service provider computer and to the user device may cause the user device to launch the carrier application and populate the carrier application with information about accepted documents. For example, the carrier application may be configured to present route details such as the route details presented via FIG. 7, along with delivery instructions, directions to and from pick up locations to delivery locations, and other suitable information.

Figure 8:
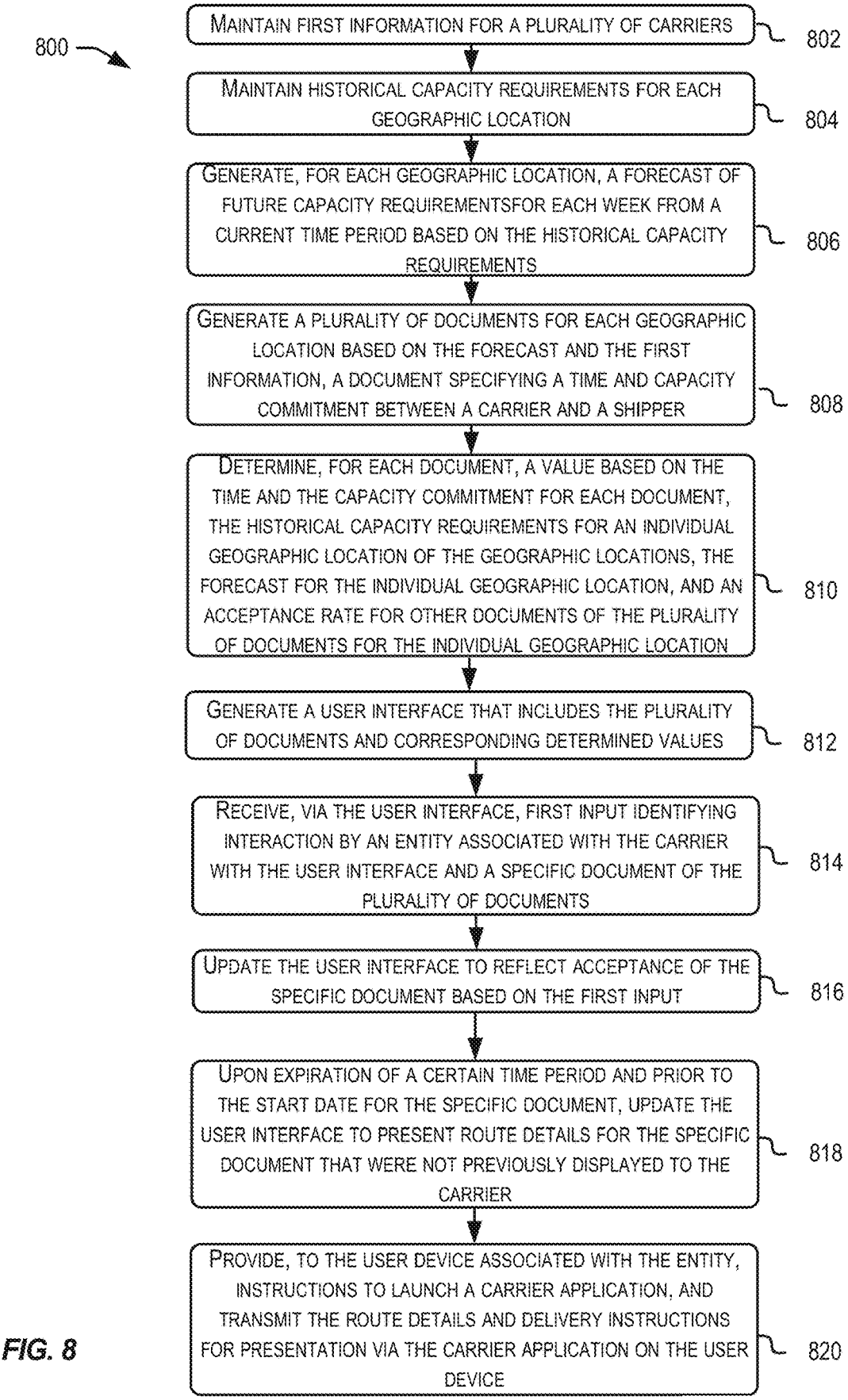
FIG. 8 illustrates an example flow diagram for an item transmission portal feature, in accordance with at least one embodiment.
Figure 9:
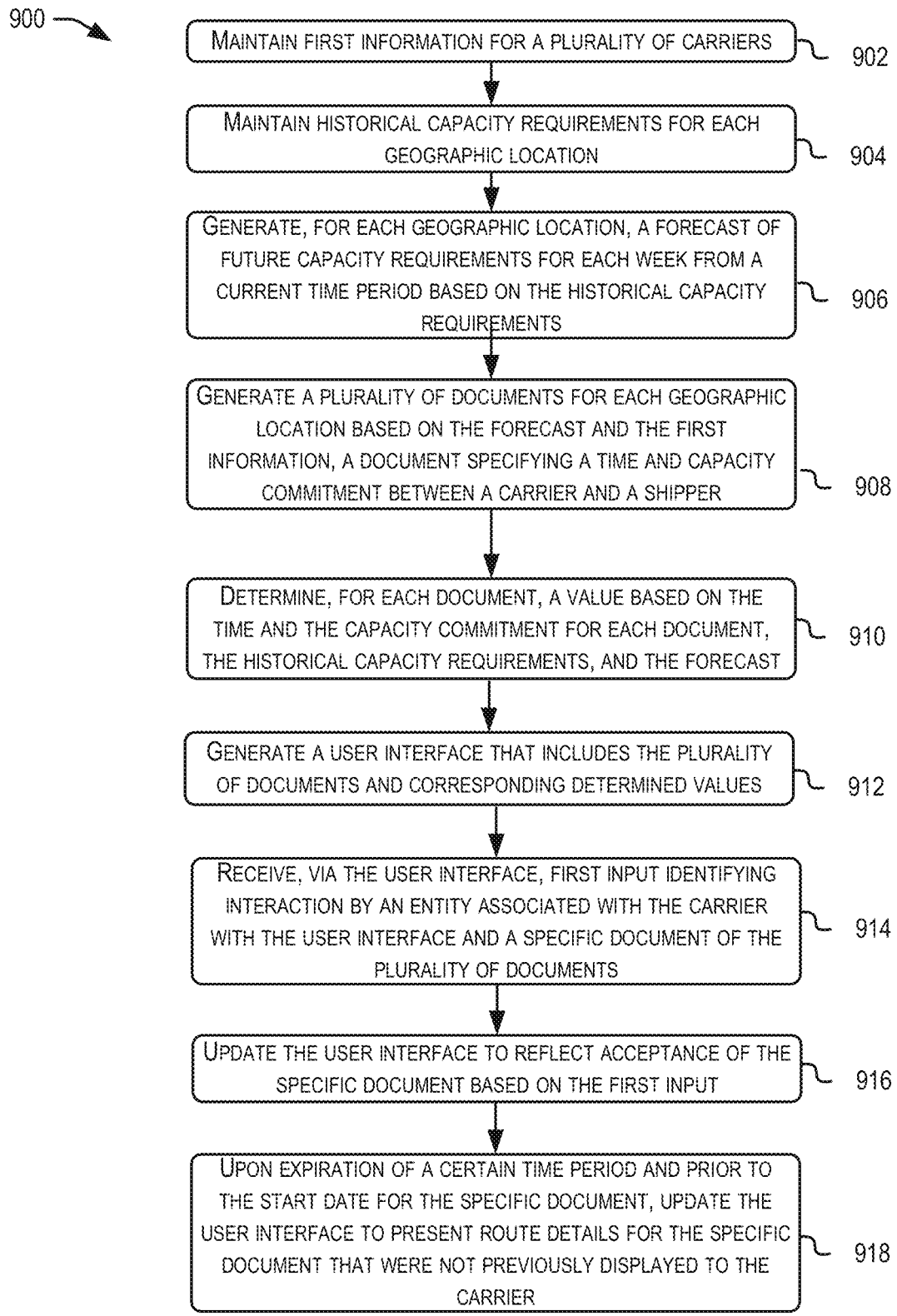
FIG. 9 illustrates an example flow diagram for an item transmission portal feature, in accordance with at least one embodiment.

FIGS. 8 and 9 illustrate example flow charts for item transmission portal features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the descried operations can be combined in any order and/or in parallel to implement the process.

Additionally, some, any, or all of the processes (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 10:
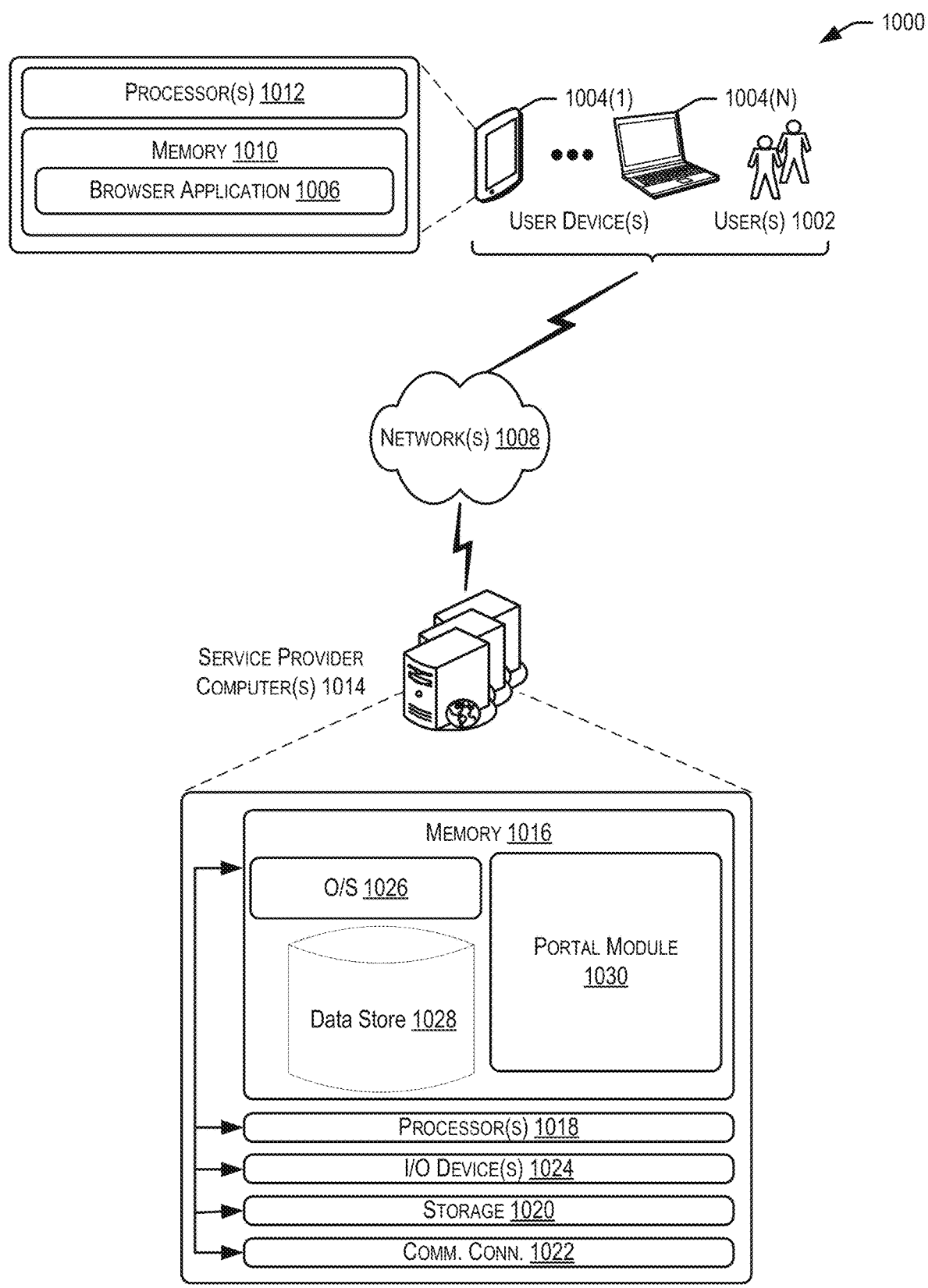
FIG. 10 illustrates an example architecture for implementing an item transmission portal feature, in accordance with at least one embodiment.

In some examples, the service provider computers (service provider computers 1014) utilizing at least the portal module 1030 depicted in FIG. 10 may perform the processes 800 and 900 of FIGS. 8 and 9. In FIG. 8, the process 800 may include maintaining first information for a plurality of carriers at 802. In embodiments, the first information may include a capacity for each carrier of the plurality of carriers and geographic locations serviced by each carrier. The capacity for each carrier may include a number of drivers available to fulfill commitments accepted by the carrier, a number and type of transmission vehicles, size of the transmission vehicles, and driver types. The process 800 may include maintaining historical capacity requirements for each geographic location at 804. In embodiments, the historical capacity requirements may identify a number of drivers, physical transmission capacity requirements, and durations for availability of transmission capacity for each geographic location associated with the item transmission portal feature. The process 800 may include generating, for each geographic location, a forecast for each week from a current time period based on the historical capacity requirements at 806. In accordance with at least one embodiment, the forecast may be a future forecast from a current day for each day of a week for a given number of weeks that identifies a capacity requirement for each geographic location for each future week time period.

The process 800 may include generating a plurality of documents for each geographic location based at least in part on the forecast and the first information at 808. A document may specify a time and capacity commitment between a carrier of the plurality of carriers and a shipper, a start date for the time and capacity commitment, and a geographic location(s) for the time and capacity commitment. For example, a document may include a contracted generated by the service provider computers implementing the item transmission portal feature that identifies the parties of the contract, the time and capacity commitment of the contract, a start date for the time and the capacity commitment of the contract, the geographic locations for the contract, as well as a dynamically determined price to be paid to the carrier for committing to and completing the terms of the contract. The contracts represented by the documents may include terms for transporting, by the carrier and on behalf of a shipper, items from one location to another location with a specified capacity, type of driver, number of drivers, within a certain duration. In embodiments, the service provider computers implementing the item transmission portal feature may generate different types of documents for each geographic location. For example, some documents may be for larger amounts of money, greater capacity, longer durations, and require a greater number of drivers and transmission vehicles. Another portion of the documents for the same geographic location may be for smaller amounts of money, less capacity, shorter durations, and require a smaller number of drivers and transmission vehicles. The service provider computers may utilize an algorithm implementing different strategies which assign weights to terms of a contract for the geographic location to generate the types of contracts or documents for the geographic location as described herein. In accordance with at least one embodiment, the service provider computers of the portal feature may implement a machine learning algorithm for dynamically generating the documents as well as automatically calculating a target amount of documents for a given future amount of time (e.g., for a future amount of weeks) for a geographic location. In embodiments, the machine learning algorithm may utilize the forecast, determined values, and performance targets for each geographic location to generate the number and type of documents for each geographic location.

The process 800 may include determining, for each document, a value based on the time and the capacity commitment for each document, the historical capacity requirements for an individual geographic location of the geographic locations, the forecast for the individual geographic location, and an acceptance rate for other documents of the plurality of documents for the individual geographic location at 810. In accordance with at least one embodiment, the service provider computers may utilize an algorithm or machine learning algorithm to dynamically generated a value for each document and update the value based on a number of factors. The value may correspond to a monetary value for accepting the terms of the document (contract) as well as completing the terms of the contract by the carrier. The number of factors may include an acceptance rate by the carrier or other carriers of documents within a specific geographic location, the amount of time left until a start date of a specific document, a number and type of documents for each geographic location, the liquidity of a carrier, current prices or historic prices from other carrier services such as a load board, current market prices (e.g., shipper market versus a carrier market), or other suitable factors described herein. In accordance with at least one embodiment, the service provider computers implementing an algorithm or machine learning algorithm for the portal feature may dynamically update the values for each document based on feedback from the carriers in real time—such as a feedback signal of an individual carrier accepting or rejecting documents, as well as aggregate data from carriers utilizing the portal feature that includes an aggregate acceptance or rejection of documents for a geographic location. An acceptance rate for a carrier may include information that indicates an amount or percentage of documents accepted by a carrier for a geographic location or multiple geographic locations, as well as engagement by the carrier with the portal feature and documents presented via the portal feature. The process 800 may include generating a user interface that includes the plurality of documents and corresponding determined values at 812. In accordance with at least one embodiment, the service provider computers may generate a user interface that incorporates the documents as well as details of the documents. The user interface may be configured to enable carriers or entities associated with the carriers to request more information about a document, filter presentation of the documents, like or favorite documents for more efficient recall at a later time, accept documents, and receive updated information about the documents such as dynamically updated values or route details for accepted documents.

The process 800 may include receiving, via the user interface, first input identifying interaction by an entity associated with the carrier with the user interface and a specific document of the plurality of documents at 814. An entity associated with the carrier can include a user, an administrator, a delivery associate, or any agent associated with a carrier. For example, a user may use a web browser of a user device to connect to the item transmission portal feature, provide login information, and be presented with a number of contracts and contact details. The user may search through a listing of the contracts and accept a contract via the user interface for a monetary value that is associated with the contract. At a later time the same user can return to the item transmission portal feature to be provided with more details about the contract such as specific delivery routes and locations that were not previously provided to the carrier and/or entity.

The process 800 may include updating the user interface to reflect acceptance of the specific document based at least in part on the first input at 816. For example, the user interface may be configured to sort, filter, and present accepted contracts versus non-accepted contracts to a user connecting to the item transmission portal feature. By providing input via the user interface a user may accept the terms of the contract as presented via the user interface for the corresponding monetary amount to commit to providing the requested capacity and time to complete the terms of the contract (e.g., item transmission of a certain size from one or more geographic locations to one or more geographic locations). The process 800 may include updating the user interface to present route details for the specific document accepted by the entity that were not previously displayed to the entity and/or carrier at 818. The route details and additional information about the accepted document may be provided upon expiration of a certain time period and prior to the start date for the specific document. For example, prior to a carrier accepting a document, the document may request a certain capacity for a geographic location with a starting date in three weeks from a current given date. The user interface may be updated two days before the start date to present route details, delivery information, and other suitable information to the carrier that were not previously presented to the carrier via the user interface. The process 800 may include, at 820, providing to the user device associated with the entity instructions to launch a carrier application and transmit the route details and delivery instructions for presentation via the carrier application on the user device. The route details and delivery instructions may include geographic locations, route information (directions to and from delivery locations), item specifics, and other information to enable the carrier to complete the terms of the accepted contract.

In FIG. 9, the process 900 may include maintaining first information for a plurality of carriers at 902. In embodiments, the first information may include a capacity for each carrier of the plurality of carriers and geographic locations serviced by each carrier. The capacity for each carrier may include a number of drivers available to fulfill commitments accepted by the carrier, a number and type of transmission vehicles, size of the transmission vehicles, and driver types. The process 900 may include maintaining historical capacity requirements for each geographic location at 904. In embodiments, the historical capacity requirements may identify a number of drivers, physical transmission capacity requirements, and durations for availability of transmission capacity for each geographic location associated with the item transmission portal feature. The process 900 may include generating, for each geographic location, a forecast for each week from a current time period based on the historical capacity requirements at 906.

The process 900 may include generating a plurality of documents for each geographic location based at least in part on the forecast and the first information at 908. A document may specify a time and capacity commitment between a carrier of the plurality of carriers and a shipper, a start date for the time and capacity commitment, and a geographic location(s) for the time and capacity commitment. For example, a document may include a contracted generated by the service provider computers implementing the item transmission portal feature that identifies the parties of the contract, the time and capacity commitment of the contract, a start date for the time and the capacity commitment of the contract, the geographic locations for the contract, as well as a dynamically determined price to be paid to the carrier for committing to and completing the terms of the contract.

The process 900 may include determining, for each document, a value based on the time and the capacity commitment for each document, the historical capacity requirements, and the forecast at 910. In accordance with at least one embodiment, the service provider computers may utilize an algorithm to dynamically generated a value for each document and update the value based on a number of factors. The value may correspond to a monetary value for accepting the terms of the document (contract) as well as completing the terms of the contract by the carrier. The process 900 may include generating a user interface that includes the plurality of documents and corresponding determined values at 912. In accordance with at least one embodiment, the service provider computers may generate a user interface that incorporates the documents as well as details of the documents. The user interface may be configured to enable carriers or entities associated with the carriers to request more information about a document, filter presentation of the documents, like or favorite documents for more efficient recall at a later time, accept documents, and receive updated information about the documents such as dynamically updated values or route details for accepted documents.

The process 900 may include receiving, via the user interface, first input identifying interaction by an entity associated with the carrier with the user interface and a specific document of the plurality of documents at 914. An entity associated with the carrier can include a user, an administrator, a delivery associate, or any agent associated with a carrier. For example, a user may use a web browser of a user device to connect to the item transmission portal feature, provide login information, and be presented with a number of contracts and contact details. The user may search through a listing of the contracts and accept a contract via the user interface for a monetary value that is associated with the contract. At a later time the same user can return to the item transmission portal feature to be provided with more details about the contract such as specific delivery routes and locations that were not previously provided to the carrier and/or entity.

The process 900 may include updating the user interface to reflect acceptance of the specific document based at least in part on the first input at 916. For example, the user interface may be configured to sort, filter, and present accepted contracts versus non-accepted contracts to a user connecting to the item transmission portal feature. By providing input via the user interface a user may accept the terms of the contract as presented via the user interface for the corresponding monetary amount to commit to providing the requested capacity and time to complete the terms of the contract (e.g., item transmission of a certain size from one or more geographic locations to one or more geographic locations). The process 900 may include, upon expiration of a certain time period and prior to the start date for the specific document, updating the user interface to present route details for the specific document accepted by the entity that were not previously displayed to the entity and/or carrier at 918. In embodiments, the service provider computer implementing the portal features described herein may be configured to provide reminders or notifications for documents whose start date is approaching. The notifications may be in the form of messages provided to a carrier or user device associated with the carrier and/or entity which include links or hyperlinks which cause an application or web browser of the user device to connect to the portal feature. The messages or notifications may be provided to carriers at a certain time period prior to the start date of accepted documents. Carriers may provide carrier preference information which may indicate a certain time range prior to the start date of a document which they wished to be informed of the upcoming document. The message or notification may provide information that was not previously provided to the carrier or entity via the user interface of the portal feature such as route details, delivery locations, complete tour information, etc.

FIG. 10 illustrates an example architecture for implementing an item transmission portal feature, in accordance with at least one embodiment. In architecture 1000, one or more users 1002 (e.g., carriers, users, consumers, entities, etc.) may utilize user computing devices 1004(1)-(N) (collectively, user devices 1004) to access a browser application 1006 or a user interface (UI) accessible through the browser application 1006, via one or more networks 1008 to access an item transmission portal generated and maintained by the service provider computers 1014. The "browser application" 1006 can be any browser control or native application that can access and display a network page or other information such as a user interface of a native software application for enabling the presentation of an item transmission portal, documents, delivery routes, representation of geographic, carrier capacities, determined values, as well as information for identifying, accepting, and receiving updated information for particular documents for a geographic location. A native software application may include an application or program that has been developed for use on a particular platform (such as an operating system) or a particular device (such as a particular type of mobile device or user device 1004). In embodiments, the user device 1004 may include one or more components for enabling the user 1002 to interact with the browser application 1006. In embodiments, the user device 1004 may include one or more software applications or native software applications such as a carrier application (not pictured). In embodiments, the service provider computers 1014 may provide instructions and content to as well as receive information and input from the carrier application of the user device 1004 via networks 1008. In accordance with at least one embodiment, the browser application 1006 may communicate with the carrier application of the user device based on instructions provided by the service provider computers 1014.

The user devices 1004 may include at least one memory 1010 and one or more processing units or processor(s) 1012. The memory 1010 may store program instructions that are loadable and executable on the processor(s) 1012, as well as data generated during the execution of these programs. Depending on the configuration and type of the user devices 1004, the memory 1010 may be volatile (such as random access memory (RAM)) and/or non-volatile (such as read-only memory (ROM), flash memory, etc.). The user devices 1004 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 1004. In some implementations, the memory 1010 may include multiple different types of memory, such as static random access memory (SRAM), dynamic random access memory (DRAM), or ROM.

Turning to the contents of the memory 1010 in more detail, the memory 1010 may include an operating system and one or more application programs or services for implementing the features disclosed herein. Additionally, the memory 1010 may include one or more modules for implementing the features described herein including the portal module 1030.

The architecture 1000 may also include one or more service provider computers 1014 that may, in some examples, provide computing resources such as, but not limited to, client entities, low latency data storage, durable data store, data access, management, virtualization, hosted computing environment or "cloud-based" solutions, content generation, item transmission portal feature implementation, etc. The service provider computers 1014 may implement or be an example of the service provider computer(s) described herein with reference to FIGS. 1-9 and throughout the disclosure. The one or more service provider computers 1014 may also be operable to provide site hosting, computer application development, and/or implementation platforms, combinations of the foregoing, or the like to the one or more users 1002 via user devices 1004.

In some examples, the networks 1008 may include any one or a combination of many different types of networks, such as cable networks, the Internet, wireless networks, cellular networks, and other private and/or public networks. While the illustrated examples represents the users 1002 communicating with the service provider computers 1014 over the networks 1008, the described techniques may equally apply in instances where the users 1002 interact with the one or more service provider computers 1014 via the one or more user devices 1004 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 1014 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 1014 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 1014 may be in communication with the user device 1004 via the networks 1008, or via other network connections. The one or more service provider computers 1014 may include one or more servers, perhaps arranged in a cluster or as individual servers not associated with one another. In embodiments, the service provider computers 1014 may be in communication with one or more third party computers (not pictured) via networks 1008 to receive or otherwise obtain data including third party shipping requirements, historical shipping requirements for a geographic location, carrier capacity information or other information utilized by the item transmission portal feature described herein.

In one illustrative configuration, the one or more service provider computers 1014 may include at least one memory 1016 and one or more processing units or processor(s) 1018. The processor(s) 1018 may be implemented as appropriate in hardware, computer-executable instructions, firmware, or combination thereof. Computer-executable instruction or firmware implementations of the processor(s) 1018 may include computer-executable or machine-executable instructions written in any suitable programming language to perform the various functions described when executed by a hardware computing device, such as a processor. The memory 1016 may store program instructions that are loadable and executable on the processor(s) 1018, as well as data generated during the execution of these programs. Depending on the configuration and type of the one or more service provider computers 1014, the memory 1016 may be volatile (such as RAM) and/or non-volatile (such as ROM, flash memory, etc.). The one or more service provider computers 1014 or servers may also include additional storage 1020, which may include removable storage and/or non-removable storage. The additional storage 1020 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1016 may include multiple different types of memory, such as SRAM, DRAM, or ROM.

The memory 1016, the additional storage 1020, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 1016 and the additional storage 1020 are all examples of non-transitory computer storage media. Additional types of non-transitory computer storage media that may be present in the one or more service provider computers 1014 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 1014. Combinations of any of the above should also be included within the scope of non-transitory computer-readable media.

The one or more service provider computers 1014 may also contain communication connection interface(s) 1022 that allow the one or more service provider computers 1014 to communicate with a data store, another computing device or server, user terminals, and/or other devices on the networks 1008. The one or more service provider computers 1014 may also include I/O device(s) 1024, such as a keyboard, a mouse, a pen, a voice input device, a touch input device, a display, speakers, a printer, etc.

Turning to the contents of the memory 1016 in more detail, the memory 1016 may include an operating system 1026, one or more data stores 1028, and/or one or more application programs or services for implementing the features disclosed herein including the portal module 1030. In accordance with at least one embodiment, the portal module 1030 is configured to implement one or more models or algorithms as described herein to determine a future forecast for capacity requirements, document specifics (capacity requirements, geographic location, size of contracts), as well as determine a value for each document that is dynamically updated as the start date for the particular document approaches. In embodiments, the portal module 1030 and service provider computers 1014 may be configured to receive or otherwise obtain information (first information) that identifies a capacity for each carrier utilizing the item transmission portal features described herein. For example, a carrier (user 1002) may utilize a user device 1004 to provide the information which includes details about the carrier's capacity such as a number of drivers available, transmission vehicle details such as type of vehicle and size of vehicle, as well as geographic locations serviced by the carrier. The portal module 1030 and the service provider computers 1014 may obtain and maintain historical capacity requirements for each geographic location of a plurality of geographic locations associated with the item transmission portal feature. The portal module 1030 and the service provider computers 1014 may be configured to dynamically generate a future forecast for each week which includes capacity requirements for each geographic location using the information and the historical capacity requirements. In embodiments, the portal module 1030 and the service provider computers 1014 may generate a plurality of documents, of varying requirements, for each geographic location based on the forecast and the information from carriers. The portal module 1030 and service provider computers 1014 may be configured to generate a user interface that includes the generated documents and a dynamically determined value for each document for presentation via the user device 1004 and browser application 1006. As users 1002, via user devices 1004, interact with the user interface and accept documents, the user interface may be updated to reflect acceptance of the documents. Users 1002 may be presented with an updated user interface that includes more information for each document that was not previously provided upon expiration of a certain time period associated with the accepted document. For example, a user 1002 via user device 1004, may, upon expiration of the certain time period, be presented with an updated user interface that provides route details for the time and capacity commitment of an accepted document. The portal module 1030 and the service provider computers 1014 may be configured to generate and transmit instructions to user devices 1004 as well as to third party computers. The instructions may identify which particular packages or items to transport, route details for a start and end delivery location for the items, and other information required to complete the task as represented in the document accepted by the carrier. The portal module 1030 may be configured to generate and transmit instructions to the user device 1004 for launching a carrier application which presents delivery routes for a geographic location to deliver the items during a period and to a location specified by an accepted document.

Figure 11:
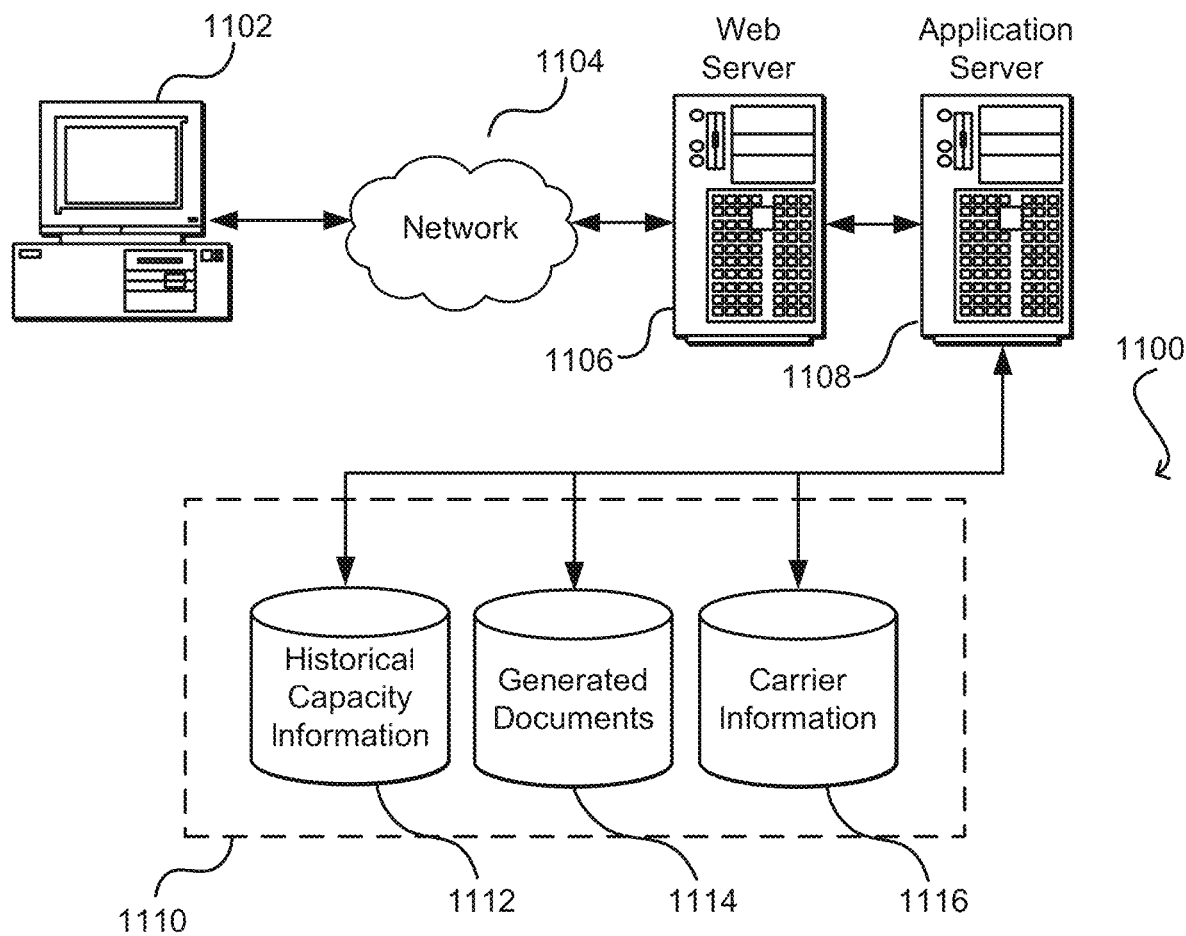
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server.

It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing historical capacity information 1112 and carrier information 1116, which can be used to serve content for the production side such as generating documents and generating a user interface that includes the documents. The data store also is shown to include a mechanism for storing generated documents 1114, which can be used for reporting, analysis, or other such purposes such as integration into a user interface that will be presented via a user device, updating a status of a document such as accepted, not accepted, or not released. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser. Contact such as user interfaces that include contracts for geographic locations may be provided to a user in response to receiving a query or login information via a user interface on the user device 1102.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    maintaining, by a computer system, first information for a plurality of carriers, the first information including at least a capacity for each carrier of the plurality of carriers and geographic locations serviced by each carrier;
    maintaining, by the computer system, historical capacity requirements for each geographic location of the geographic locations;
    generating, by the computer system and for each geographic location, a forecast of future capacity requirements for each week of a plurality of weeks from a current time period based at least in part on the historical capacity requirements;
    generating, by the computer system, a plurality of documents for each geographic location based at least in part on the forecast and the first information, a document of the plurality of documents specifying a time and capacity commitment between a carrier of the plurality of carriers and a shipper, and a start date for the time and the capacity commitment;
    determining, by the computer system, for each document of the plurality of documents, a value based at least in part on the time and the capacity commitment for each document, the historical capacity requirements for an individual geographic location of the geographic locations, the forecast for the individual geographic location, and an acceptance rate for other documents of the plurality of documents for the individual geographic location;

obtaining, by the computer system, click stream data for the carrier, the click stream data including mouse hover interactions with certain portions of previously presented user interfaces presenting previously generated documents by an entity associated with the carrier and interactions with an accept feature for one or more documents of the previously generated documents via the previously presented user interfaces;

selecting, by the computer system, a portion of the plurality of documents based at least in part on the click stream data;

generating, by the computer system, a user interface that includes the portion of the plurality of documents and corresponding determined values;

receiving, by the computer system and via the user interface, first input identifying interaction by the entity associated with the carrier with the user interface and a specific document of the portion of the plurality of documents;

updating, by the computer system, the user interface to reflect acceptance of the specific document based at least in part on the first input;

upon expiration of a certain time period and prior to the start date for the specific document:

updating, by the computer system, the user interface to present route details for the specific document that were not previously displayed to the carrier, the route details including a particular pickup location corresponding to the individual geographic location of the specific document and a drop-off location corresponding to the individual geographic location of the specific document;

receiving, by the computer system and via the user interface, second input of an interaction by the entity with the route details for the specific document;

providing, by the computer system and to a user device associated with the entity, instructions to launch a carrier application; and transmitting, by the computer system and to the user device, the route details and delivery instructions for presentation via the carrier application on the user device.

2. The computer-implemented method of claim 1, further comprising maintaining, by the computer system, a policy indicating an amount of documents that can be accepted by each carrier.

3. The computer-implemented method of claim 2, wherein updating the user interface to reflect acceptance of the specific document is further based at least in part on the policy.

4. The computer-implemented method of claim 1, wherein the value for an individual document of the plurality of documents is updated based on a difference between the current time period and the start date for the individual document.

5. A non-transitory computer-readable storage medium storing computer-executable instructions that, when executed by a computer system, configure the computer system to perform operations comprising:

maintaining first information for a plurality of carriers, the first information including at least a capacity for each carrier of the plurality of carriers and geographic locations serviced by each carrier;

maintaining historical capacity requirements for each geographic location of the geographic locations;

generating, for each geographic location, a forecast of future capacity requirements for each week of a plurality of weeks from a current time period based at least in part on the historical capacity requirements;

generating a plurality of documents for each geographic location based at least in part on the forecast and the first information, a document of the plurality of documents specifying a time and capacity commitment between a carrier of the plurality of carriers and a shipper, and a start date for the time and the capacity commitment;

determining, for each document of the plurality of documents, a value based at least in part on the time and the capacity commitment for each document, the historical capacity requirements, and the forecast;

obtaining click stream data for the carrier, the click stream data including mouse hover interactions with certain portions of previously presented user interfaces presenting previously generated documents by an entity associated with the carrier and interactions with an accept feature for one or more documents of the previously generated documents via the previously presented user interfaces;

selecting a portion of the plurality of documents based at least in part on the click stream data;

generating a user interface that includes the portion of the plurality of documents and corresponding determined values;

receiving, via the user interface, first input identifying interaction by the entity associated with the carrier with the user interface and a specific document of the portion of the plurality of documents;

updating the user interface to reflect acceptance of the specific document based at least in part on the first input; and upon expiration of a first time period and prior to the start date for the specific document:

updating the user interface to present route details for the specific document that were not previously displayed to the carrier, the route details including a particular pickup location corresponding to a individual geographic location of the specific document and a drop-off location corresponding to the individual geographic location of the specific document.

6. The non-transitory computer-readable storage medium of claim 5, wherein the instructions, when executed by the computer system, further configure the computer system to perform operations comprising:

receiving, via the user interface, second input of an interaction by the entity with the route details for the specific document;

providing, to a user device associated with the entity, instructions to launch a carrier application; and transmitting, to the user device, the route details and delivery instructions for presentation via the carrier application on the user device.

7. The non-transitory computer-readable storage medium of claim 5, wherein the user interface is further configured to present a feature for each document of the plurality of documents which saves a corresponding document for subsequent viewing by the carrier.

8. The non-transitory computer-readable storage medium of claim 5, wherein a portion of the plurality of documents may have a first time and first capacity requirement that is greater than another portion of the plurality of documents that have a second time and second capacity requirement based at least in part on the geographic location, the historical capacity requirements for the geographic location, and the forecast for the geographic location.

9. The non-transitory computer-readable storage medium of claim 5, wherein the instructions, when executed by the computer system, further configure the computer system to perform operations comprising maintaining a performance rate for each carrier of the plurality of carriers, wherein a portion of the plurality of documents are visible to a portion of the plurality of carriers prior to another portion of the plurality of carriers based on respective performances rates for the portion of the plurality of carriers.

10. The non-transitory computer-readable storage medium of claim 5, wherein the instructions, when executed by the computer system, further configure the computer system to perform operations comprising:
receiving confirmation that the carrier has canceled acceptance of the specific document; and
in response to the confirmation, updating the user interface to present the specific document as available.

11. The non-transitory computer-readable storage medium of claim 5, wherein the user interface is configured to present, at a second time period, a second portion of the plurality of documents, and subsequently to present, at a third time period, a third portion of the plurality of documents, the second time period being different than the third time period, and the second portion of the plurality of documents being different from the third portion of the plurality of documents.

12. The non-transitory computer-readable storage medium of claim 5, wherein the instructions, when executed by the computer system, further configure the computer system to perform operations comprising obtaining the click stream data from the carrier interacting with the user interface.

13. The non-transitory computer-readable storage medium of claim 12, wherein the instructions, when executed by the computer system, further configure the computer system to perform operations comprising updating the plurality of documents based at least in part on the click stream data for the carrier.

14. A computer system comprising:
a memory configured to store computer-executable instructions; and
a processor in communication with the memory configured to execute the computer-executable instructions to at least:
maintain first information for a plurality of carriers, the first information including at least a capacity for each carrier of the plurality of carriers and geographic locations serviced by each carrier;
maintain historical capacity requirements for each geographic location of the geographic locations;
generate, for each geographic location, a forecast of future capacity requirements for each week of a plurality of weeks from a current time period based at least in part on the historical capacity requirements;
generate a plurality of documents for each geographic location based at least in part on the forecast and the first information, a document of the plurality of documents specifying a time and capacity commitment between a carrier of the plurality of carriers and a shipper, and a start date for the time and the capacity commitment;
determine, for each document of the plurality of documents, a value based at least in part on the time and the capacity commitment for each document, the historical capacity requirements, and the forecast;
obtain click stream data for the carrier, the click stream data including mouse hover interactions with certain portions of previously presented user interfaces presenting previously generated documents by an entity associated with the carrier and interactions with an accept feature for one or more documents of the previously generated documents via the previously presented user interfaces;
select a portion of the plurality of documents based at least in part on the click stream data;
generate a user interface that includes the portion of the plurality of documents and corresponding determined values;
receive, via the user interface, first input identifying interaction by the entity associated with the carrier with the user interface and a specific document of the portion of the plurality of documents;
update the user interface to reflect acceptance of the specific document based at least in part on the first input; and
upon expiration of a certain time period prior to the start date for the specific document:
update the user interface to present route details for the specific document that were not previously displayed to the carrier, the route details including a particular pickup location corresponding to a individual geographic location of the specific document and a drop-off location corresponding to the individual geographic location of the specific document.

15. The computer system of claim 14, wherein the processor in communication with the memory is further configured to execute the computer-executable instructions to at least determine a certain time period prior to the start date for the specific document based at least in part on historical performance information of the carrier.

16. The computer system of claim 15, wherein the processor in communication with the memory is further configured to execute the computer-executable instructions to at least:
upon expiration of the certain time period and prior to the start date for the specific document:
receive, via the user interface, second input of an interaction by the entity with the route details for the specific document;
provide, to a user device associated with the entity, instructions to launch a carrier application; and
transmit, to the user device, the route details and delivery instructions for presentation via the carrier application on the user device.

17. The computer system of claim 14, wherein the processor in communication with the memory is further configured to execute the computer-executable instructions to at least update values for a portion of the plurality of documents based at least in part on an acceptance rate for another portion of the plurality of documents and corresponding start dates for the portion of the plurality of documents.

18. The computer system of claim 14, wherein the processor in communication with the memory is further configured to execute the computer-executable instructions to at least filter, prior to generating the user interface, the plurality of documents based at least in part on a geographic location of the geographic locations serviced by a specific carrier of the plurality of carriers.

19. The computer system of claim 14, wherein each document of the plurality of documents presented via the user interface includes the time and the capacity commitment, the start date, an end date for the time and the capacity commitment, a specific geographic location of the geographic locations, the corresponding value, and an hour work limitation for a given period between the start date and the end date.

20. The computer system of claim 19, wherein the capacity commitment includes a driver type and a number of drivers.

* * * * *